United States Patent
Bond et al.

(10) Patent No.: US 9,614,977 B1
(45) Date of Patent: Apr. 4, 2017

(54) REAL-TIME MEDIA CONTROL FOR AUDIO AND MULTIMEDIA CONFERENCING SERVICES

(75) Inventors: Gregory William Bond, Hoboken, NJ (US); Eric Cheung, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1238 days.

(21) Appl. No.: 11/303,214

(22) Filed: Dec. 16, 2005

(51) Int. Cl.
- *H04M 3/42* (2006.01)
- *H04M 11/06* (2006.01)
- *H04M 3/56* (2006.01)
- *H04L 29/08* (2006.01)

(52) U.S. Cl.
CPC ......... *H04M 11/066* (2013.01); *H04M 3/567* (2013.01); *H04L 29/08072* (2013.01); *H04M 3/56* (2013.01)

(58) Field of Classification Search
CPC ...... H04M 11/066; H04M 3/567; H04M 3/56; H04M 3/568; H04M 2203/5063; H04M 7/006; H04M 2207/18; H04L 29/08072; H04L 29/06027
USPC ................ 379/93.17, 93.21, 202.01, 203.01; 370/261, 262; 455/416
See application file for complete search history.

(56) References Cited

U.S. PATENT DOCUMENTS

| | | | |
|---|---|---|---|
| 5,434,913 A * | 7/1995 | Tung et al. | 379/202.01 |
| 5,440,624 A * | 8/1995 | Schoof, II | 379/202.01 |
| 5,623,690 A | 4/1997 | Palmer et al. | |
| 5,692,213 A | 11/1997 | Goldberg et al. | |
| 5,889,945 A * | 3/1999 | Porter et al. | 709/204 |
| 5,978,835 A | 11/1999 | Ludwig et al. | |
| 6,285,746 B1 | 9/2001 | Duran et al. | |
| 6,298,129 B1 | 10/2001 | Culver et al. | |
| 6,320,588 B1 | 11/2001 | Palmer et al. | |
| 6,501,739 B1 * | 12/2002 | Cohen | 370/260 |
| 6,519,771 B1 * | 2/2003 | Zenith | 725/32 |
| 6,631,410 B1 | 10/2003 | Kowalski et al. | |
| 6,831,675 B2 | 12/2004 | Shachar et al. | |
| 6,889,385 B1 | 5/2005 | Rakib et al. | |
| 6,959,322 B2 | 10/2005 | Ludwig et al. | |
| 7,653,013 B1 * | 1/2010 | Moran | H04L 12/1822 370/260 |
| 7,707,262 B1 * | 4/2010 | Bill | 709/207 |
| 2004/0008635 A1 * | 1/2004 | Nelson et al. | 370/260 |
| 2004/0203677 A1 * | 10/2004 | Brown et al. | 455/416 |
| 2004/0230651 A1 * | 11/2004 | Ivashin | 709/204 |
| 2006/0179110 A1 * | 8/2006 | Brown | 709/204 |
| 2007/0058795 A1 * | 3/2007 | Arrant et al. | 379/202.01 |
| 2007/0067387 A1 * | 3/2007 | Jain et al. | 709/204 |
| 2007/0133524 A1 * | 6/2007 | Kwon | 370/356 |

\* cited by examiner

*Primary Examiner* — Oleg Asanbayev
(74) *Attorney, Agent, or Firm* — Hoffmann & Baron, LLP

(57) ABSTRACT

A method for controlling media presentation during a teleconference. The method generally includes the steps of coupling a buffer operatively to a host device and a participant device, storing media information associated with the teleconference in the buffer and directing playback of the media information from the buffer to the participant device. The host device is associated with a host of the teleconference and the host thereby enables playback of the stored media information to a participant other than the host.

12 Claims, 4 Drawing Sheets

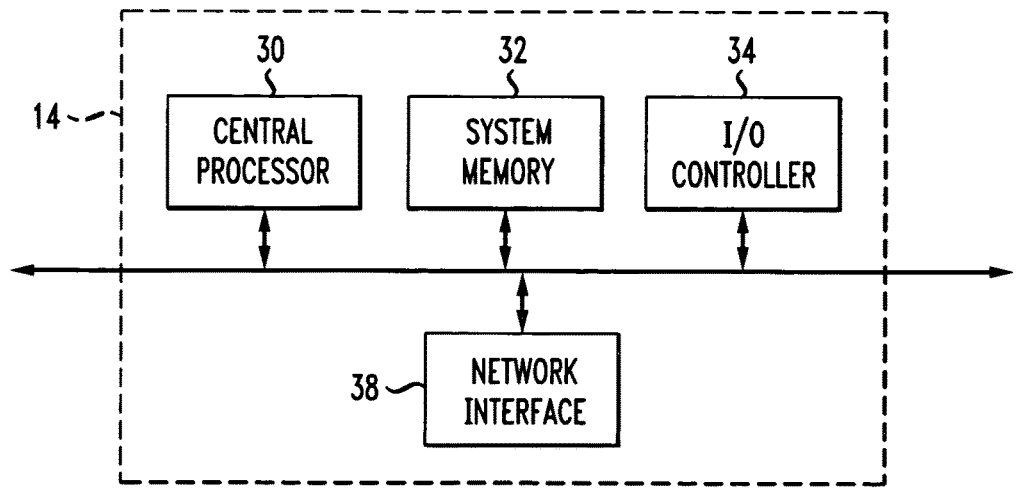
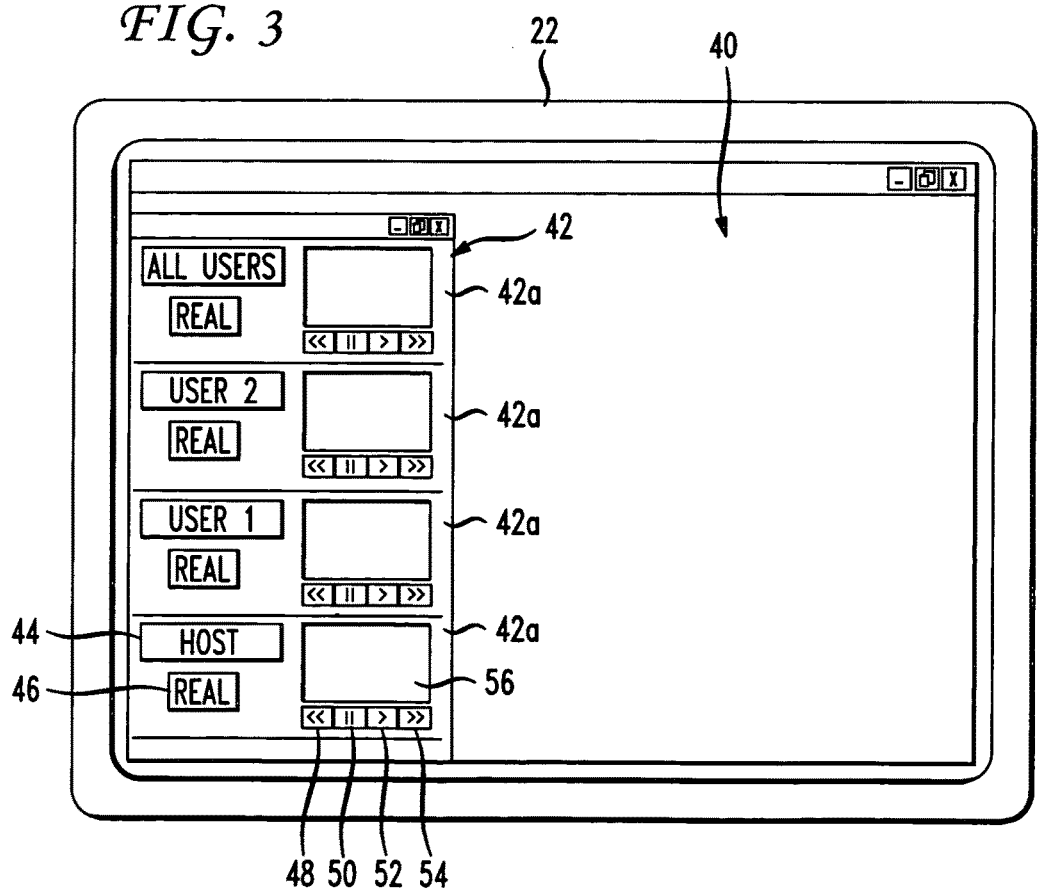

REAL-TIME MEDIA CONTROL FOR AUDIO AND MULTIMEDIA CONFERENCING SERVICES

FIELD OF THE INVENTION

The present invention relates generally to teleconferencing and video-conferencing applications and, more particularly, to a method for controlling the real-time media content during such teleconferencing and video-conferencing applications.

BACKGROUND OF THE INVENTION

A teleconference is a conference held among people in different locations using telecommunications equipment, such as telephones or video conferencing terminals. Audio and, sometimes, video supplied by each participant on the conference is communicated to every other participant on the conference to enable communications among the conference participants. The equipment that enables communications among the conference participants is a bridge or a switch, which broadcast data received from each conference participant to all other conference participants.

In today's state-of-the-art teleconferencing and video-conferencing applications, the media (audio and video) are presented to each participant in real-time. In other words, what a participant says at any particular time is instantaneously heard by the other participants. This demands constant attention on the part of each participant, which in a busy business environment is not always possible. For example, while participant A is talking, if a participant B is momentarily distracted by other tasks, B must ask A to repeat what was said. As another example, participant C who joins the conference late would also miss the discussion that has already taken place.

Today's state-of-the-art conferencing applications may also provide recording capability, but the recording is usually available only after the conclusion of the conference. It has been proposed, for example in U.S. Pat. No. 5,692,213 to Goldberg et al., to provide a method and system for recording a real-time multimedia presentation and replaying a missed portion at an accelerated rate until the missed participant the ability to momentarily divert his attention from the real-time presentation, go back to a previous part of the presentation, replay that part of the presentation and then rejoin the presentation in real-time.

However, one drawback with the system proposed in U.S. Pat. No. 5,692,213 is the requirement for each participant to have a computer system with substantial processing power and storage capacity. The proposed system would also require an efficient method of distributing and updating software to each participant.

Accordingly, it would be desirable to enhance the current conferencing products to allow users better control of the media content. More specifically, it would be desirable to provide an improved method and system for controlling real-time multimedia content, which separates the processing and presentation of multimedia content and also allows centralized buffering and processing and shared control of the presentation by the host and each participant.

SUMMARY OF THE INVENTION

The present invention involves a method for controlling media presentation during a teleconference. The method according to the present invention generally includes the steps of coupling a buffer operatively to a host device and a participant device, storing media information associated with the teleconference in the buffer and directing, by the host device, playback of the media information from the buffer to the participant device. The host device is associated with a host of the teleconference and the host thereby enables playback of the stored media information to a participant other than the host.

In a preferred embodiment, the method further includes the step of transferring real-time media presentation to the centralized buffer via a conference bridge. The teleconference participant can be in communication with the buffer via a telephone or a computer. The step of instructing the buffer preferably includes the step of accessing an interactive display on the host computer for controlling playback of the recorded portion, wherein at least one of a plurality of teleconference participants is selected from the interactive display to playback the recorded portion to the selected teleconference participant.

The method may additionally include the step of controlling playback of the recorded portion by the teleconference participant. However, the teleconference participant's control is preferably coordinated with the host control.

The method further preferably includes the steps of providing the teleconference participant with the real-time media presentation and providing the teleconference participant with an indicator of whether the real-time media presentation or the recorded portion is being received by the teleconference participant. Also, input from the teleconference participant to the real-time media presentation is preferably prevented while the recorded portion is being played back to the teleconference participant. The method may also include the step of placing markers by the host computer on the recorded portion for subsequent referencing of selected portions of the recorded portion.

The present invention further involves a system adapted to control media information during a teleconference. The system generally includes a buffer for storing media information associated with the teleconference, a participant device operatively coupled to the buffer and a host device operatively coupled to the buffer. The host device is associated with a host of the teleconference and directs playback of the media information from the buffer to the participant device, thereby enabling playback of the stored media information to a participant other than the host.

The system further preferably includes a conference bridge in communication with the participant device, the host device and the buffer for receiving real-time media information from the user device and the host device and transferring the real-time media presentation to the centralized buffer. The user device may be adapted to additionally control playback of the recorded portion back to the user device. Also, the host computer preferably includes an interactive display for controlling playback of the recorded portion to a selected user interface.

The preferred embodiments of the method and system of the present invention, as well as other objects, features and advantages of this invention, will be apparent from the following detailed description, which is to be read in conjunction with the accompanying drawings.

BRIEF DESCRIPTION OF THE DRAWINGS

FIG. 2 is a block diagram illustrating the components of the centralized buffer shown in FIG. 1.

FIG. 3 shows a host display screen illustrating the host interface of the present invention.

DETAILED DESCRIPTION OF THE PREFERRED EMBODIMENTS

Figure 1:
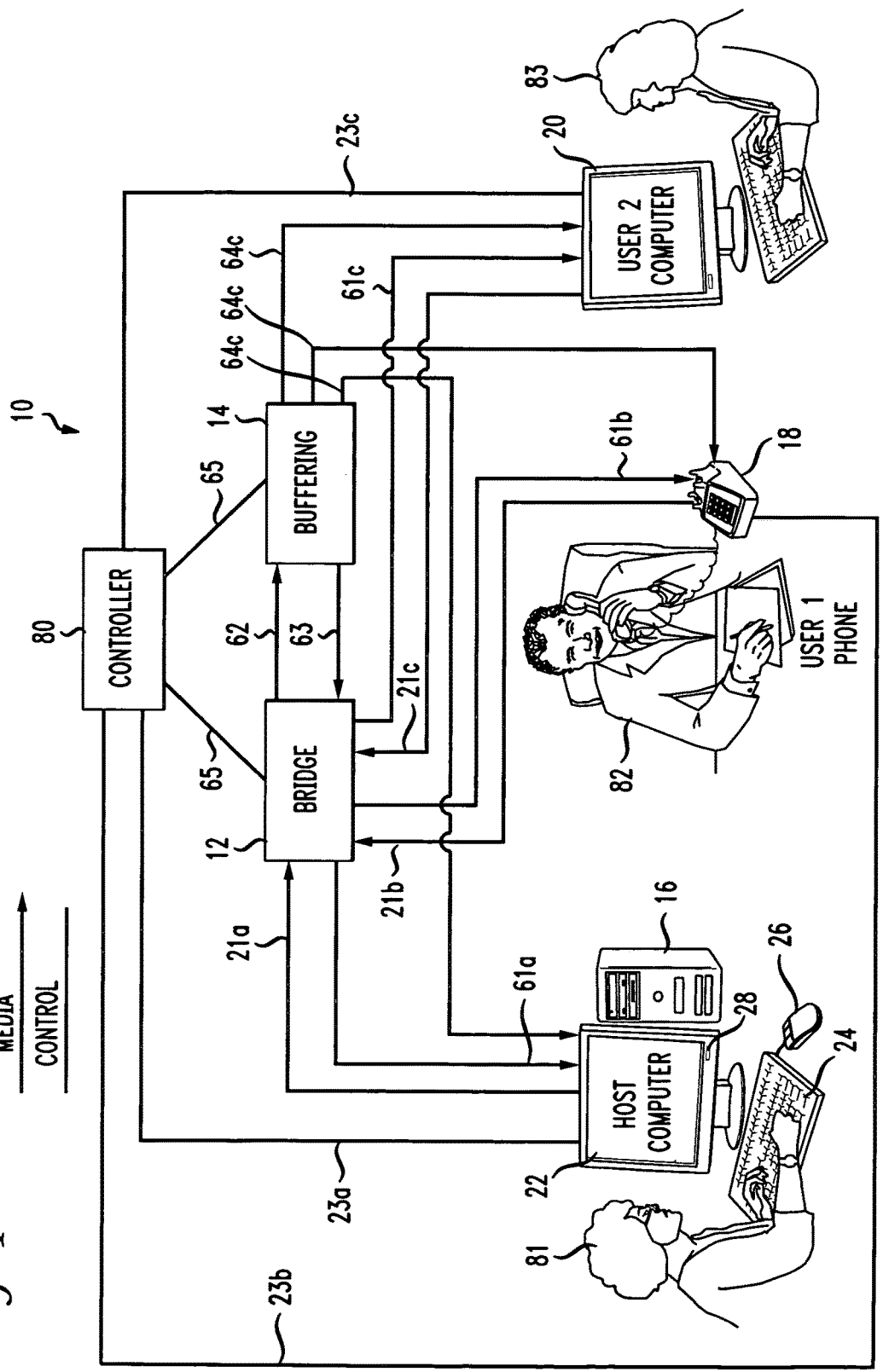
FIG. 1 is a block diagram illustrating the system for controlling real-time multimedia content according to the present invention.

Referring to FIG. 1, the system 10 according to the present invention generally includes a controller 80 (application server, controller software, and the like), a conference bridge 12 (audio bridge, video bridge, and the like) and a centralized buffer/media delay processor 14. The controller 80, the conference bridge 12 and the centralized buffer 14 are in communication with each other and are further connected to a number of users (conference host 81 and conference participants 82, 83) via a user device, such as a user phone 18 or a user computer 16, 20. More specifically, each participant 16, 18, 20 (i.e. recipient of the multimedia content) may receive media from a single buffer/media delay processor 14. This design eliminates the need for duplicated media storage and media processing.

During normal real-time conferencing operation, the participant devices 16, 18 and 20 transmit media to the conference bridge 12. This is represented in FIG. 1 as 21a, 21b, and 21c respectively. The conference bridge 12 performs the necessary mixing and processing, and transmits the combined media, including audio, video, whiteboard data, presentation, and so on, to the participant devices 16, 18, and 20, in media streams 61a, 61b, and 61c respectively. In general, the media streams 61a, 61b and 61c usually have different content. For example, media stream 61a may not contain the audio data from the host user 81.

The conference bridge 12 service may be configured for use with plain old telephone service (POTS), integrated services digital network (ISDN), voice over IP (VOIP), video conferencing, H.323 video standards, H.261 audio standards, or essentially any standard for communicating multimedia. The selection and modification of a suitable conference bridge 12 for use with the system 10 of the present invention will be understood by those of skill in the art from the description herein.

At the same time, the combined media stream 62 is transmitted from bridge 12 to the centralized buffer 14, which stores and processes the combined multimedia content. Therefore, the centralized buffer 14 contains the recording of the multimedia conference from the start of the conference up to the current time.

When a participant 83 requests a playback of a specific portion of the recording at a specific speed, control signals 23c are transmitted from the participant device 20 to the controller 80. Controller 80 then instructs the bridge 12 to stop transmitting media to participant device 20, and also to stop adding media from the participant to the mix. Controller 80 also instructs the buffer/media delay processor 14 to begin transmitting stored media to the user. This processing includes speeding up or slowing down of the recording media. During the playback, the participant may also request a playback from a different point, skip forward and skip backward by pre-defined time intervals, pause, fast forward (playing at increased speed, while maintaining pitch of audio content), change playback speed, and the like. The participant may also stop playback and return to the real-time conference. At this point, the controller 80 instructs the bridge 12 to restore transmitting and receiving media from the participant, and instructs the centralized buffer 14 to stop transmitting to the participant.

Therefore, the system 10 allows user 2 to skip backwards a few seconds to review what user 1 said, perhaps at a slower speed, without having to ask user 1 to repeat. In another example, if user 2 joins the conference late, user 2 is given a means to playback the conference from the beginning, skipping forward over non-salient discussion, and may fast-forward to review past discussion quickly, and finally catch up to the current time in the conference.

In addition to the above operation, a participant, usually the conference host 81, may also request that a recording be played into the real-time conference. In this case, host device 16 sends control signal 23a to controller 80. Controller 80 then instructs centralized buffer 14 to transmit media stream 63 to bridge 12, which mixes in the media to the real-time media, which is in turn transmitted to the participants in streams 61a, 61b and 61c. The host can further control the playback. For example, the host may request a playback from a different point, skip forward and skip backward by pre-defined time intervals, pause, fast forward (playing at increased speed, while maintaining pitch of audio content), change playback speed, and the like. The host may also stop the playback, at which point the centralized buffer 14 stops the transmission.

Therefore, the system 10 allows a past portion of the conference to be reviewed by all the participants. For example, the host may play back a discussion that took place earlier in the conference. During the playback, if a participant speaks the audio will be mixed in and heard by the other participants. Therefore this allows comments to be made during the playback. The host may also pause the playback to allow for extensive discussion before resuming the playback.

This invention also allows the host to override what media each participant receives. For example, the host 81 may wish to speak to all participants in real-time. In this case, the controller 80 instructs the centralized buffer 14 to stop transmission of any playback in progress, and instructs the bridge 12 to resume transmission to all participants. It may also be desirable that the host can observe whether each participant is in real-time or in playback mode, and in the latter case what playback is being viewed. Further the host may control the playback to each participant. In this case, the control signals from the host and the participant must be coordinated carefully. This may be performed by defining a priority policy for each conference.

The buffer 14 may consist of a network server computer running the Unix operating system on an Ethernet network. The server computer may include a supplementary digital signal processing subsystem to support the task of encoding media for accelerated/decelerated media playback. The network can be implemented by any means that is known in the art. FIG. 2 is a block diagram of a centralized buffer 14 according to the present invention. The buffer 14 generally includes subsystems, such as a central processor 30, memory 32, I/O controller 34, and network interface 38. A multimedia presentation is converted into electronic media signals and transferred to the buffer 14 via the conference bridge 12 and stored in memory 32. Once stored, the presentation can be accessed and processed as described herein.

As will be described in further detail below, the central buffer 14 determines the format of the media content to be presented to each user device 16, 18, 20. For example, the host computer 16 and any user computers 20 may receive multimedia information to be displayed in an accelerated format. The computers 16, 20 generally include a display screen 22, a keyboard 24 and a mouse 26. Other user interfaces, such as a microphone, a speaker and a video camera are also preferably provided for facilitating a teleconference. It should again be noted, however, that the processing to support accelerated/decelerated playback is not in the endpoint, but rather, it is located in the centralized buffer 14. The endpoints (e.g., computer, black phone) receive the same media stream format regardless of the playback speed.

Turning to FIG. 3, the display screen 22 of the host computer 16 will generally display interactive symbols enabling the host to control the buffer 14. For example, the display screen 22 may include a main window 40 in which video output of the conference provided from the conference bridge 12 is displayed. The display screen 22 also displays an inset window 42 allowing the host to control the media content to all participants. It is also conceivable for the display screen 22, and associated software, to display individual inset windows 42a for each of the participants in the teleconference to allow the host to control the media content to each participant individually.

Each inset window 42 includes a participant identifier 44 and participant specific controls, which enables the host to control the media presentation to the participants. These controls preferably include a real-time play 46, rewind 48, pause 50, play 52 and fast-forward 54. A participant display 56 is also preferably provided to display the media currently being presented to a particular participant. The participant display 56 may display an actual image, or it may consist of a counter for indicating what portion of the conference is being played.

The controls function substantially similar to the controls that are found on a television video cassette recorder (VCR) and the host operates them by "clicking" on them with a mouse or any other input device known in the art. For example, during a real-time presentation, if the host clicks pause 50 in the "user 1" window, a pause mode for user 1 is entered where the screen image, or the audio output, to user 1 is stopped.

In use, inputs 23 from the host 16 to control the playback are transmitted from the host computer to the buffer 14 via the screen display 22 provided on the host computer. Inputs 23a from other participants can be transmitted using touch tones or speech commands, in the case of a telephone user interface 18, display screens or web interfaces, in the case of a computer user interface 20, or other means known in the art. For example, playback control can be achieved by a graphical user interface, similar to the host's interface, on a participant's desktop computer 20, either as a standalone application or a web page. It can also be achieved by touch-tone entry on a telephone key pad 18.

However, in addition to each participant 16, 18, 20 being able to control their own media playback, the present invention further provides for host control of the media playback for all participants. In other words, the host 16 has the ability to control what media content is presented to each of the users 18 and 20.

More specifically, the host 16 is provided with the ability to transmit a request 23 to the buffer 14 instructing the buffer as to what signal is to be sent from each of the buffer's ports. For example, the host 16 can instruct the buffer 14 to send a real-time media signal 21 from the first user port so that user 1 will receive the presentation in real-time and can further instruct the buffer to send stored signals 21a, representing a particular chronological point in the presentation, from the second user port so that user 2 will receive a playback of the presentation.

Figure 4:
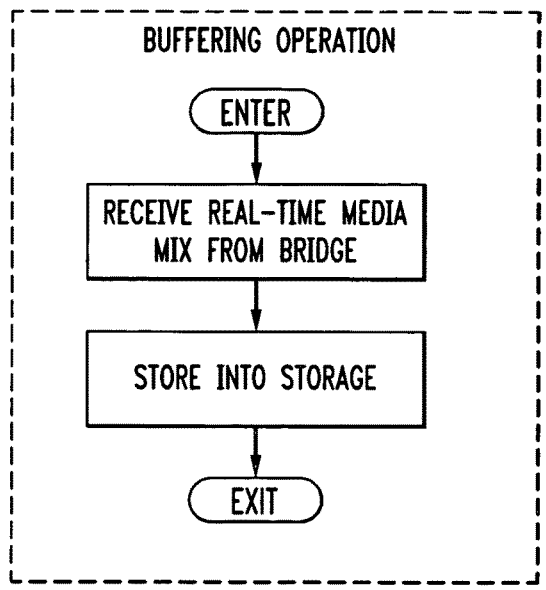
FIG. 4 shows a high-level flow chart of the buffering operation according to the present invention.
Figure 5:
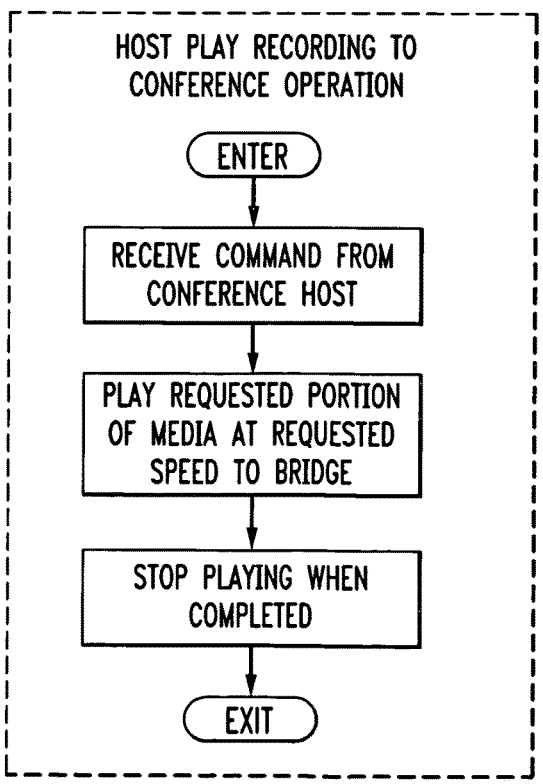
FIG. 5 shows a high-level flow chart of the host play recording to conference operation according to the present invention.
Figure 6:
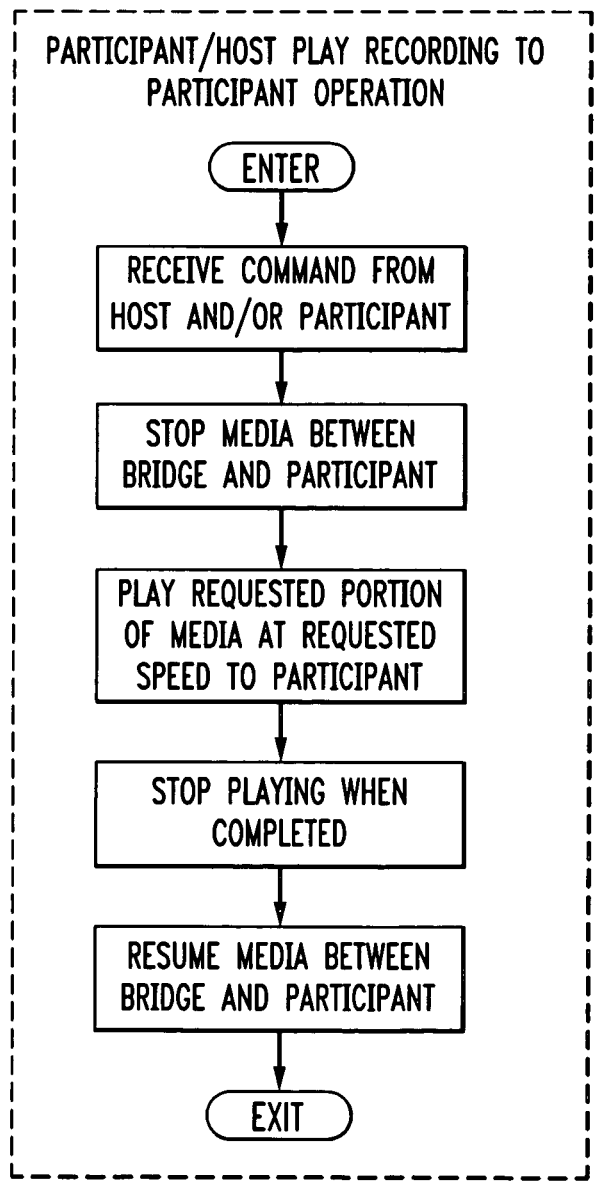
FIG. 6 shows a high-level flow chart of the participant/host play recording to participant operation according to the present invention.

FIGS. 4-6 are flow charts outlining operation of the system as described above. The flow charts represent one or more software routines executing in the central processor 30 of the buffer 14. The flow charts may be implemented by any means known in the art. For example, any number of computer programming languages, such as "C," "C++," Pascal, FORTRAN, assembly language, and the like, may be used. Further, various programming approaches such as procedural or object oriented programming, or artificial intelligence techniques, may be employed. The steps of the flow charts may be implemented by one or more software routines, processes, subroutines, modules, etc. It will be apparent that the flow charts are illustrative of but the broad logical flow of the method of the present invention and that steps may be added to, or taken away.

As a result of the present invention, interaction with the buffer 14 is possible via a "dumb" device (such as a conventional telephone) or a device with limited processing and storage capabilities (such as an inexpensive VoIP video phone or a compact mobile phone). For example, the present invention allows a user to participate in a teleconference from a mobile phone while driving an automobile. Obviously, this user will have limited capabilities in controlling the media content while driving. Thus, if this user joins a teleconference late, the system will inform the user that he is, for example, 10 minutes late, and will offer a choice of 'join immediately', 'playback at double speed', 'playback at triple speed', and so on. If the user opts for playback, the system plays the buffered audio at the specified speed until it catches up. The user may also use touch tones or speech commands to skip forward, backward, or adjust playback speed.

The system 10 may further provide a participant with a clear indication of whether he/she is receiving real-time media or media from the past. When a participant is receiving past media, he/she may be muted automatically. The media content may also remain available after the conference is completed. This provides the users with a familiar user interface to access the conference media recording, whether the conference is still ongoing or completed. The system may also allow the host 16 and/or the participants 18, 20 to place markers during the conference. The participants may then use the controls to jump to the markers.

The present invention is particularly well-suited in "Call Center" applications. For example, a customer service agent may transfer an incoming telephone call to another agent and quickly playback what the customer and first agent have already talked about. The invention may also be applicable to 3-way calling type features (typically found in business PBX). For example, workers A and B have a discussion, and realize they need to bring in worker C. In a conventional system, they would conference in C, and repeat some of the discussion to C. With the present invention, A or B (the host) can playback past discussion into the 3-way call.

Thus, the present invention provides for the separation of the processing and presentation of multimedia content and also allows centralized buffering and processing and shared control of the presentation by the host and each participant. While the benefits of host control of the conference have been discussed herein, it should be noted that all participant control is still supported by the present invention. Also, while conference control by a computer is emphasized herein, it should also be clear to those skilled in the art that host/participant control can be accomplished by many other means, such as control via the web from a suitable phone or computer, instant messaging control from a computer or suitable phone, speech or touch tone control from a phone.

Thus, although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method for controlling a media presentation during a conference between participants comprising:
    storing, in a buffer connected to a plurality of conference user devices, media information associated with the conference, the media information including audio, video, and whiteboard information, the plurality of conference user devices comprising a host device and a plurality of participant devices;
    directing, by the host device originating the conference, playback of the audio information from the buffer to a first participant device, the playback beginning at a selected playback point, wherein the host device controls the playback without a command from the first participant device, wherein directing comprises accessing an interactive display on the host device to direct the playback of the audio information in the stored media information;
    mixing contemporaneous audio comments made by a second participant during playback of the audio information with playback of the audio information forming a continuous stream of media information associated with the conference;
    transmitting the continuous stream of media information to the first participant device;
    excluding contemporaneous audio information originating from the first participant device during transmission of the continuous stream of media information from inclusion in the continuous stream of media information transmitted to the first participant device; and
    selecting at least one of the plurality of participant devices from the interactive display and controlling the playback of the audio information in the stored media information to the selected participant device.

2. A method as defined in claim 1, wherein the first participant device is a telephone.

3. A method as defined in claim 1, wherein the first participant device is a computer.

4. A method as defined in claim 1, wherein the host device is a computer.

5. A method as defined in claim 1, further comprising providing the first participant device with an indication of whether the audio information in the stored media information is being transmitted to the first participant device.

6. A method as defined in claim 1, further comprising suppressing media originating from the first participant device to which the stored audio information is being played.

7. A method as defined in claim 1, further comprising providing markers by the host device in the stored media information to reference a portion of the stored media information.

8. A system that controls media information during a conference between participants comprising:
    a buffer storing media information associated with the conference as stored media information, the media information including audio, video, and whiteboard information;
    a plurality of conference user devices comprising:
        a plurality of participant devices connected to the buffer; and
        a host device connected to the buffer, the host device initiating the conference and directing playback of the audio information from the buffer to a first participant device, the playback beginning at a selected playback point, wherein the host device controls the playback without a command from the first participant device;
    a conference bridge configured to mix contemporaneous audio comments made by a second participant during playback of the audio information with playback of the audio information forming a continuous stream of media information associated with the conference, the continuous stream of media information being transmitted contemporaneously to the first participant device, the conference bridge excluding contemporaneous audio information originating from the first participant device during transmission of the continuous stream of media information from inclusion in the continuous stream of media information transmitted to the first participant device; and
    an interactive display associated with the host device that is configured to direct the playback of the audio information in the stored media information, wherein the host device is configured to select at least one of the plurality of participant devices from the interactive display, the host device being configured to control the playback of the audio information in the stored media information to the selected participant device.

9. A system as defined in claim 8, wherein the conference bridge is further configured to receive media information from the at least one of the plurality of participant devices and the host device and to transfer the received media information to the buffer.

10. A system as defined in claim 8, wherein the first participant device is a telephone.

11. A system as defined in claim 8, wherein the first participant device is a computer.

12. A system as defined in claim 8, wherein the host device is a computer.

* * * * *